June 12, 1928.

R B. CRAWFORD

AIR CONDITIONING SYSTEM

Filed April 23, 1927

INVENTOR.
R. Brace Crawford
BY
Erwin, Wheeler & Woolard
ATTORNEYS.

June 12, 1928.
R. B. CRAWFORD
AIR CONDITIONING SYSTEM
Filed April 23, 1927 · 2 Sheets-Sheet 2
1,673,552
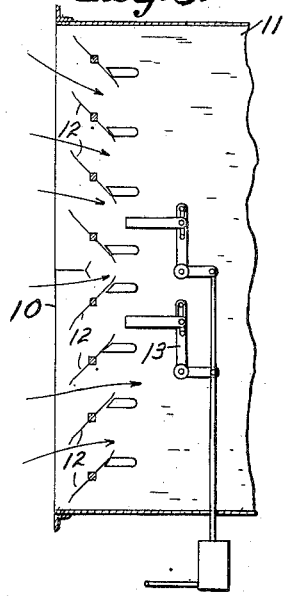
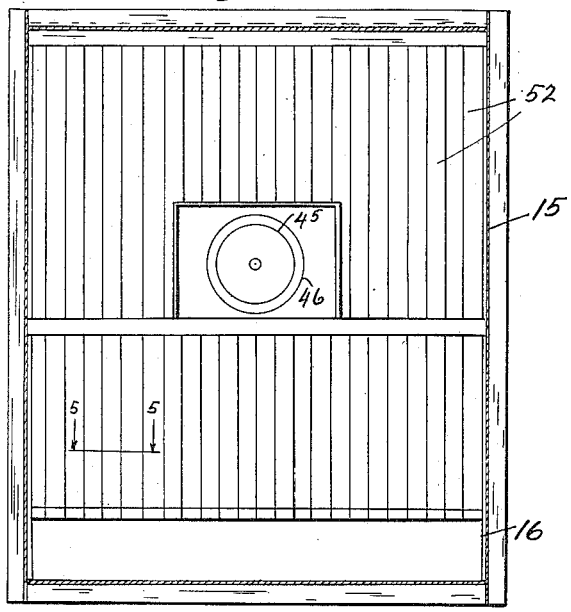
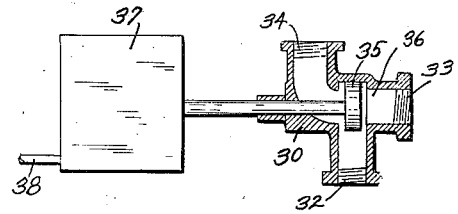
INVENTOR.
R. Brace Crawford
BY
Erwin, Wheeler & Woolard
ATTORNEYS Patented June 12, 1928.

1,673,552

UNITED STATES PATENT OFFICE.

R BRACE CRAWFORD, OF CHICAGO, ILLINOIS, ASSIGNOR TO BAYLEY MANUFACTURING COMPANY, OF MILWAUKEE, WISCONSIN, A CORPORATION OF WISCONSIN.

AIR-CONDITIONING SYSTEM.

Application filed April 23, 1927. Serial No. 185,942.

This invention relates to improvements in air conditioning systems.

In conditioning air for use in theaters and for special factory purposes and the like, the desired conditions of humidity and temperature can most readily be reached if the air delivered by the conditioning apparatus is always at constant temperature and at saturation for such temperature. With the temperature of the air and its complete saturation known, its subsequent treatment to produce a desired resultant temperature and humidity can easily be effected.

It is the purpose of this invention to provide a method and apparatus for controlling the temperatures and relative humidity of air and for maintaining the air as nearly as possible exactly at the dew point or point of saturation for any given desired temperature. The apparatus used to control temperature and humidity preferably consists of a refrigerating coil and spray under thermostatic control. The problem is to make the thermostat accurately sensitive to factors which will maintain the air at complete saturation, it being remembered that the air must ordinarily be cooled in such an apparatus and that within the finite compass of practicable machinery the cooling must ordinarily be accomplished by contact of the air with some substance at a very much lower temperature than is ultimately desired. The difficulty in arriving at absolute saturation lies in the fact that the moisture content of the air condenses in contact with this necessarily much cooler medium and tends to leave the air somewhat deficient in moisture from the standpoint of saturation at the ultimate desired temperature. A thermostat placed in the moisture treated air leaving the apparatus will not give the desired control because such air is not at complete saturation when delivered from previously known apparatus. Attempts have been made also to utilize a thermostat subjected to water leaving the apparatus, but, since the water is initially much colder than the air, it is not correct to assume that the water will completely reach the temperature of the air within the limits of any finite apparatus. Accordingly, a thermostat so placed will not accurately be sensitive to saturation temperatures.

In accordance with the present invention, the thermostat is so located as to be within the range of such portions of the air stream passing through the device as still carry finely divided particles of water. The response of the thermostat under such circumstances involves three separate factors: first, the temperature of the unevaporated particles of water; second, the temperature of the unmoistened particles of air; and third, the variation produced by evaporation of water on the thermostat.

The temperature produced on the thermostat by the entrained particles of water collecting thereon must necessarily be below the wet bulb temperature of the air if the water is to act as a coolant. The temperature of the air at this point will be somewhat higher than its ultimate temperature and will tend to counteract the effect on the thermostat of the relatively low temperatured water. The effect of evaporation occurring at the thermostat is obviously to lower the temperature to some extent. Evaporation acting alone would give a wet bulb reading at the thermostat, but in this instance such reading is modified by the presence of the water and the somewhat warmer air. It has been shown by experiment that the resultant effect of these three factors acting simultaneously on the thermostat is to give a thermostat response substantially in accordance with the saturation point for any given temperature.

In the drawings:

Figure 3 is a detail view taken at 3—3 in Figure 2.

Figure 4 is a section taken at 4—4 in Figure 2.

Figure 5 is a section taken at 5—5 in Figure 4.

Figure 6 is a detail of the control valve which is one of the temperature regulating means.

Like parts are identified by the same reference characters throughout the several views.

Figure 1:
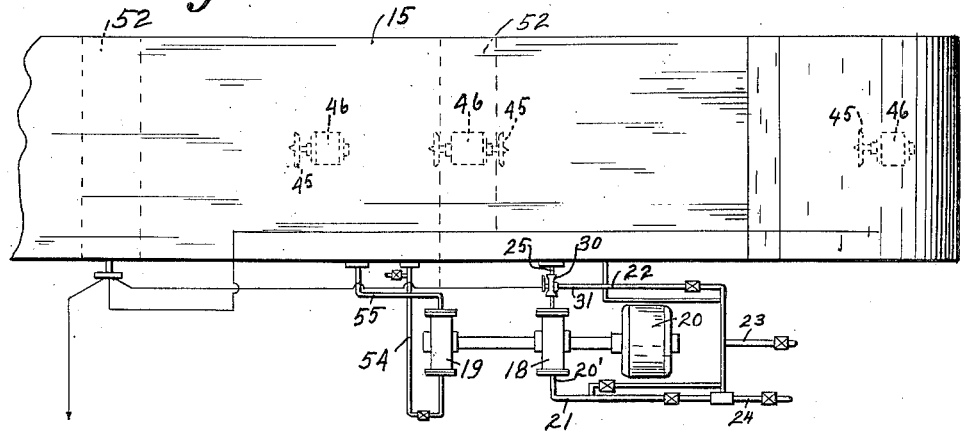
Figure 1 is a plan view of my improved air conditioning system with portions of the casing broken away to expose its interior construction.

Air enters the machine from above through the admission port 10 and downwardly curving housing 11. The admission port is controlled by any suitable means such as the pivoted valve members 12 shown in Figure 3 and controlled by the mechanism designated generally by the reference character 13. Under ordinary circumstances this air is returned from the room to which air is supplied by the machine but such return is not necessary to the successful operation of the device inasmuch as it is frequently desirable to use outside air in whole or in part, as is well known in this field.

The conditioning machine proper consists of an elongated casing 15 which, for convenience of description, may be assumed to be divided into two separate chambers, in the first of which the primary consideration is temperature control and in the second of which the primary consideration is the increase of humidity. It will be understood, however, that the operations in each chamber have their effect in a general way upon both temperature and humidity. The division of the space within casing 15 and chambers is somewhat arbitrary inasmuch as there are only baffles separating the chambers. The first chamber will be understood to be that space lying above a tank 16 over which the air passes during its initial movement through the housing, and the second chamber lies above a second tank 17 which is contiguous to tank 16.

Outside of housing 15 are circulating pumps 18 and 19 both of which may be driven by one motor 20. Pump 18 circulates liquid in the first chamber and pump 19 circulates liquid in the second chamber.

To the inlet 20 of the pump 18 leads a pipe 21 which is connected by pipe 22 with tank 16 to draw liquid therefrom and is also connected by pipe 23 with a source of fresh water supply and by pipe 24 with a source of steam supply. The various valves controlling flow through the several pipes illustrated are shown conventionally. The output pipe 25 of the pump leads to the interior of housing 15 and is there connected with a spraying system hereinafter to be described. It is also connected, preferably exteriorly of the housing, with a three-way by-pass valve 30 subject to thermostatic control and arranged to by-pass the pump output through pipe 31 to the pump inlet pipe 21. An arrangement of this valve is shown diagrammatically in Figure 6, in which port 32 is connected to the pump outlet. Port 33 is connected to the pipe which leads to the spraying device, and port 34 is connected to the by-pass pipe 31. The valve member 35 is reciprocable in chamber 36 to direct the influx through port 32 into one or the other of the outlet ports 33 or 34, according to its position. Its position is regulated by mechanism housed within the box 37 which is subject to the control of the thermostat to which it is connected by a pressure pipe 38 or any other suitable means.

This by-pass arrangement allows both of the pumps 18 and 19 to be mounted on a common shaft and continuously rotated. Subject to the control of the thermostat the output of pump 18 is either passed through the spraying system or diverted therefrom and by-passed to the pump inlet as above described.

Connected to the supply pipe 26 from pump 18 are two risers 40 and 41 which supply nozzles 42 and 43 respectively. They also supply liquid to a system of overhead drip or spray coils 44. Associated with each of the nozzles 42 and 43 is a rotary spray distributor which consists of a disk 45 mounted on the armature shaft of a motor 46, preferably in axial alignment with the nozzle. The nozzle delivers the water in a stream to the center of the disk upon which the water deposits itself in a thin sheet to be thrown centrifugally in the form of spray which fills the chamber in which the spraying device operates.

Figure 2:
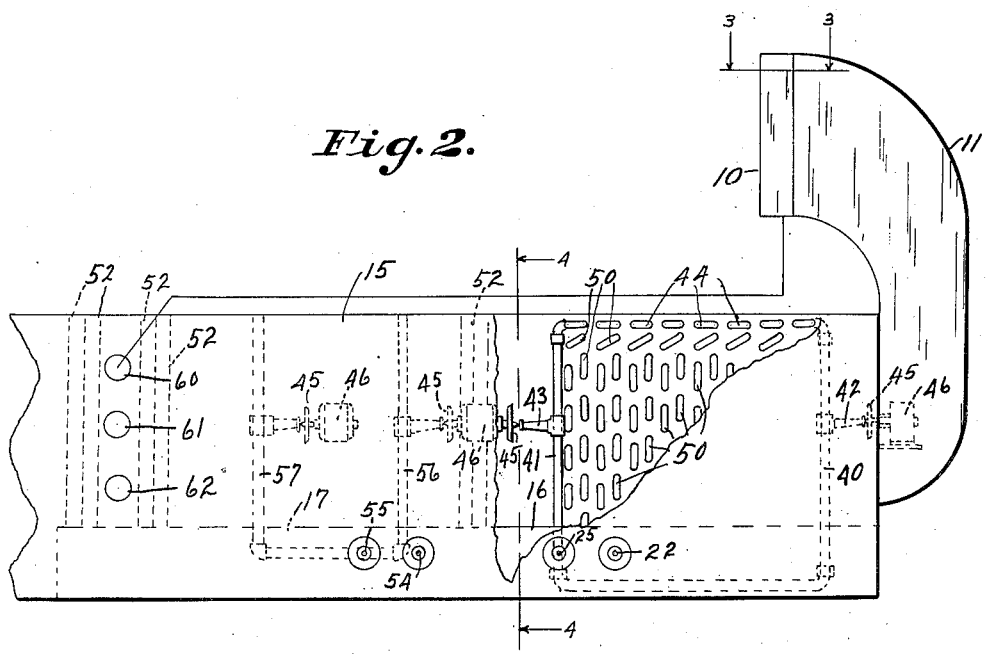
Figure 2 is an elevational view of my improved air conditioning system with portions of the casing broken away to expose the interior construction.

These spraying devices are so located that all air passing through the system must traverse the spray intermediate the two spraying devices above described and immediately below the drip coils 44 is a series of refrigeration coils 50 which are compactly assembled in the path of the advancing air, as clearly appears in Figure 2. The water delivered by the sprayers and by the drip coils passes over the refrigerating coils and ultimately is returned by gravity to the tank 16 from which it is again withdrawn through port 22 by pump 18 for redelivery through the sprayers and drip coils.

I have found that an extremely accurate control of temperature may be effected through the above arrangement. As the air enters the system and passes over the refrigerating coils it tends to deposit its moisture upon the coils in the form of frost. This necessarily occurs because of the fact that in order to reduce the temperature of the air materially and quickly within the limits of any machine of reasonable size, the coils must be very much colder than the air, the rate of heat transfer being proportionate to the difference in temperature. Of course, all of the air does not contact with the coils, and that portion of the air which does so contact must be chilled far below the ultimate desired temperature in order that the average temperature of the entire mass may be as desired. The air, therefore, which contacts with the refrigerating coils delivers up its moisture under these conditions of extreme cold to the coils which become frosted.

Now frost is a natural insulator, as is well known, but, so far as I am aware, no one has heretofore conceived of the possibility of controlling temperatures through controlling the formation of frost. In my improved apparatus the thermostatic control of the by-pass around pump 18 so operates as to regulate the amount of water delivered to the spraying devices and the drip coils above described. When large quantities of water are delivered through the spraying devices and coils, all frost is washed from the refrigerating coils, the metallic surfaces of which are thereby exposed to air passing through the system. When, however, the by-pass valve 35 moves to the right, as viewed in Figure 6, to partially close the outlet port 33 and to open more widely the by-pass outlet 34, the result is to decrease the amount of water handled by the sprays and to allow an increase in the amount of frost carried by the refrigerating coils 50. The immediate result is to reduce the extent to which air will be refrigerated in the first part of my improved conditioning system. Not only will the air encounter smaller quantities of the refrigerated water in the form of spray or drops, but also the refrigerating coils will be partially insulated to a less or to a greater degree by the formation of frost thereon. In this way an extremely accurate sensitive control of temperatures is had, the amount of frost being directly proportioned to the flow of water across the coils and the flow of water being made directly dependent upon the position of the thermostatically controlled by-pass valve. From the foregoing it will be understood that the water as well as the refrigerating coils themselves has a very considerable refrigerating effect upon the air since the water is maintained at a low temperature by its repeated passage across the coils and by melting frost therefrom.

In leaving the first chamber of my improved air conditioning system the air and such spray as is entrained therewith is caused to enter a series of eliminator baffles 52. A few of these baffles are shown in enlarged detail in Figure 5, and the direction of air passage therethrough is indicated by arrows. The baffles are S-shaped in horizontal section and are arranged with their major horizontal axis set at an inclination to the direction of air travel through the machine. As a result, they provide a very effective set of baffle surfaces which are encountered by the air with the result that water or spray which is being carried entrained by the air is delivered to these surfaces and adheres thereto, to return by gravity into the storage tank 16. As the air enters the second chamber, therefore, it is comparatively free of unevaporized water.

In the second chamber the air is immediately subjected to the action of additional spray devices made up as previously described, of rotatable disks 45 operated by motors 46. One such disk may conveniently be driven by the projected armature shaft of the same motor which drives the last disk in the first chamber of the device. The water for these spraying devices in the second chamber is supplied by pump 19 from tank 17. The suction pipe 54 of the pump leads from tank 17 through the wall of housing 15, and the pump output pipe 55 passes back to the interior of the housing where it connects with pipes 56 and 57 leading respectively to the first and second spraying devices in this chamber. It is the function of these spraying devices to supply any moisture requisite to maintain at saturation the air which leaves the machine. It is not necessary that these devices should be subject to thermostatic control under ordinary circumstances since the thermostats which regulate the mechanism in the first chamber are ordinarily adequate to maintain the desired temperature and saturation.

At the outlet of the second chamber there are a plurality of sets of baffles 52 similar to those previously described. Intermediate these baffles are located the several thermostats whereby the operation of the machine is controlled. These thermostats should not be separated by too many baffles from the second chamber of the machine nor should they be entirely exposed to the spray within such chamber. As previously described, it is the intent of this invention that the several thermostats controlling the machine should be subject to the conditioned air and to a small portion of spray entrained therewith, whereby the temperature of each single thermostat is affected by air, by water, and by evaporation. The evaporation effect is, of course, extremely limited since the air is approximately saturated at this point. Control is effected, therefore, in major part by the resultant temperatures of both air and water. In this way I have found it possible to deliver the air from the machine at practically perfect saturation.

After passing the first baffles in the series adjacent the thermostats and picking up from their wet surfaces and from the entrained spray such remaining portion of moisture content as it is capable of carrying, the air passes through a sufficient number of additional series of baffles so that it is delivered from the machine substantially dry, in the sense that it carries no free or entrained moisture, its entire moisture content being evaporated.

With the output of the machine comprising saturated air at a known temperature, it is readily possible to calculate and maintain any desired conditions of humidity in any desired room space.

The thermostats used to control the machine will vary according to specific requirements of the installation and according to the type of machine used. I have illustrated in the accompanying drawings three separate thermostats, all of which are positioned intermediate sets of baffles as above described. Thermostat 60 controls the louvre valves 12 which regulate admission of air from the room to the machine. Thermostat 61 controls the by-pass valve 35 through the interposed valve regulating mechanism 37. Thermostat 62 controls the refrigerating mechanism which supplies refrigerating coils. It is immaterial whether the admission of steam be effected manually or by thermostat.

The entire machine has been described from the standpoint of use during warm weather, but it will be understood that its use during cold weather is equally satisfactory. In cold weather it is possible either to admit steam to the coils 50 or to deliver the steam as shown in the drawings directly to the water spraying system in the first chamber. In either case, the air will then be warmed instead of cooled and the spray provides conveniently that excess of moisture which enables the air to supply the deficiency in humidity which would otherwise be caused by the increase in temperature. If the steam is delivered to the coils 50 the water will assist in controlling temperatures under the regulation of the thermostatically controlled by-pass valve 35. When large quantities of water are delivered to evaporate on the surfaces of the refrigerating pipes there will be a tendency to reduce the temperature effect of the pipes on the air. When lesser quantities of water are delivered to the drip coils the relatively dry surfaces of the pipes will impart more heat to the air. Accordingly, the thermostat controlled by by-pass regulation works in the same way whether the coils 50 are refrigerated or heated. Obviously, however, it is only when the coils 50 are refrigerated that the extremely sensitive and effective control through sluicing the frost from the pipes can be had.

I claim:

1. The combination with a housing arranged for air flow therethrough, of tempering coils within said housing, a circulating system including pipes arranged to deliver water across said coils, a pump for circulating water in said system, a by-pass around said pump, and a thermostat exposed to air which has passed said coils and operatively connected to control said by-pass, whereby to regulate the flow of liquid through said system across said coils and to control the transfer of heat between said air and said coils.

2. The method of controlling the refrigeration of air which consists in exposing a refrigerated surface to the air and sluicing such surface with more or less liquid according to the amount of cooling effect desired.

3. The method of regulating the refrigeration of air which consists in exposing to the air a refrigerated surface sufficiently cool to reduce to frost the moisture in such air, and the sluicing of such surface with more or less water according as the air delivered thereacross is too warm or too cold.

4. The method of tempering air which consists in exposing the air to a tempering surface and sluicing said surface with water, and varying the amount of such water to supply greater or less quantities thereof according as the air delivered from said surface is too hot or too cold.

5. The combination with a conduit for air, of a circulatory system for spraying water in said conduit including a tank, a circulatory pump, and means for delivering water in the form of spray to the interior of said conduit in a position to fall back to said tank; refrigerating means in said conduit in the path of water in said system; a second system beyond the first system in said conduit and including a second tank, a second pump and a second spray delivering means; and baffle means interposed between said systems and adapted to prevent the delivery of spray from said first system to said second system, whereby said systems are enabled to operate at differing temperatures.

6. The combination with a conduit for air of a circulatory system for spraying water in said conduit including a tank, a circulatory pump, and means for delivering water in the form of spray to the interior of said conduit in a position to fall back to said tank; refrigerating means in said conduit in the path of water in said system; a second system beyond the first system in said conduit and including a second tank, a second pump and a second spray delivering means; and baffle means interposed between said systems and adapted to prevent the delivery of spray from said first system to said second system, whereby said systems are enabled to operate at differing temperature, together with a thermostat operatively connected to regulate the effect of said refrigerating means upon air subject to said first circulating system and located beyond said second circulatory system.

7. The combination with an air conduit, of first and second tanks therein, baffles in said conduit intermediate said tanks, a circulatory spraying system upon each side of said baffles and each adapted to withdraw liquid from a tank and to spray said liquid within the portion of said conduit above said tank for gravity return thereto, a refrigerating coil in the path of liquid spray above said first mentioned tank, and means for regulating liquid flow through the circulatory system associated with said first mentioned tank.

8. The combination with an air conduit, of first and second tanks therein, baffles in said conduit intermediate said tanks, a circulatory spraying system upon each side of said baffles and each adapted to withdraw liquid from a tank and to spray said liquid within the portion of said conduit above said tank for gravity return thereto, a refrigerating coil in the path of liquid spray above said first mentioned tank, means for regulating liquid flow through the circulatory system associated with said first mentioned tank, and a thermostat operatively connected to regulate said means and located in the path of air flow in said conduit beyond said second mentioned tank.

9. The combination with air refrigerating means, of humidifying means disposed in the path of air delivered from said refrigerating means and adapted to restore thereto moisture lost through contact of such air with said refrigerating means, said air humidifying means including a spraying device, together with a thermostatic regulator protected only in part from spray entrained by air passing said spraying device, whereby to be subject both to air and to spray, said thermostatic regulator being operatively connected to control said refrigerating means.

10. The combination of a conduit, a refrigerating coil located therein, water circulating means arranged to sluice said coil and including a pump provided with a by-pass, a valve controlling the by-pass of said pump, independent water circulating means in the path of air passing through said conduit beyond said refrigerating coils and including a pump and a spraying device, a plurality of sets of baffles in the path of air delivered beyond said second water circulating means, and a thermostat operatively connected with said by-pass valve and disposed beyond a first set of baffles in the path of said air.

11. The combination with a conduit for air, of a plurality of independent water circulatory systems including spraying devices within said conduit and circulating pumps for delivering water to said devices, a single driving means connected with both of said pumps for the simultaneous and continuous operation thereof, a valve controlled by-pass for one of said pumps whereby to control the flow of liquid through the circulatory system supplied by such pump, and a thermostat in said conduit operatively connected with the valve of said by-pass.

12. The combination with a conduit for air, of a plurality of independent water circulatory systems including pumps for delivering water to said devices, a single driving means connected with both of said pumps for the simultaneous and continuous operation thereof, a valve controlled by-pass for one of said pumps whereby to control the flow of liquid through the circulatory system supplied by such pump, and a thermostat in said conduit operatively connected with the valve of said by-pass, together with a set of refrigerating coils disposed in said conduit and subject to the sluicing of liquid circulated in the by-pass controlled system.

E BRACE CRAWFORD.